(12) United States Patent
Bargman

(10) Patent No.: US 6,367,373 B2
(45) Date of Patent: Apr. 9, 2002

(54) ROTISSERIE CRADLE

(76) Inventor: Ronald D. Bargman, 31821 Carlelder, Beverly Hills, MI (US) 48025

( * ) Notice: Subject to any disclaimer, the term of this patent is extended or adjusted under 35 U.S.C. 154(b) by 0 days.

(21) Appl. No.: 09/768,190

(22) Filed: Jan. 23, 2001

Related U.S. Application Data

(60) Provisional application No. 60/177,368, filed on Jan. 24, 2000.

(51) Int. Cl.$^7$ .............................. A47J 37/00; A47J 37/04
(52) U.S. Cl. ...................... 99/427; 99/419; 99/421 R; 99/426; 99/448; 99/449
(58) Field of Search .................. 99/339, 340, 352–355, 99/419–421 V, 426, 441, 427, 394, 444–450, 482; 126/25 R, 9 R, 41 R; 426/506, 523

(56) References Cited

U.S. PATENT DOCUMENTS 4,505,195 A * 3/1985 Waltman ...................... 99/427
4,593,613 A * 6/1986 Waltman ...................... 99/427
4,688,477 A * 8/1987 Waltman ...................... 99/427
5,325,767 A * 7/1994 Beller ...................... 99/421 R
5,497,697 A * 3/1996 Promny ...................... 99/427

* cited by examiner

*Primary Examiner*—Timothy F. Simone
(74) *Attorney, Agent, or Firm*—John R. Benefiel

(57) ABSTRACT

A rotisserie cradle including a trough shaped cradle constructed entirely of a rod framework to be lighter, easier to clean, and cheaper to manufacture, with food hold down grates positionable by swing arms pivoted to the inside of the cradle framework so as to allow manually settable positioning of the grates against the food to hold the same against the inside of the cradle framework. Each hold down grate is tiltable in any direction to engage any contour of the food to be held, and the swing arm movement accommodates different sized food items. Friction snubbers can be used to maintain the swing arm positions. A pair of socket blocks for receiving the rotational support shafts are mounted by the rod members forming the cradle framework.

24 Claims, 7 Drawing Sheets

ROTISSERIE CRADLE

CROSS REFERENCE OF THE RELATED APPLICATION

This application claims the benefit of provisional patent application Ser. No. 60/177,368, filed on Jan. 24, 2000.

BACKGROUND OF THE INVENTION

This invention concerns rotisseries and more particularly cradle type rotisseries, in which the food is held by being clamped in a confining rotated basket cradle rather than being pierced by a spit or penetrating prongs.

The cradle design by eliminating the piercing of meat pieces avoids the escape of internal juices is reduced as well as the conduction of heat to the inside of the roast, producing a juicier, more tender roast.

Such cradle type rotisseries are described in U.S. Pat. Nos. 4,505,192; 4,593,613; 4,688,477; 4,787,302; 5,325,767; and 5,497,697. In these prior designs, the meat or other food item to be roasted is clamped by adjustably positioned rods, engaging the surface of the food item to be roasted. This adjustment requires some time and effort to set, and to release. In addition, these adjustments require mittens to be worn when the cradle is too hot to handle.

The prior cradles have been constructed of a series of parallel rods welded, bolted or riveted to a pair of end plates, the end plates mounting the rotary supports for the cradles. The approach has several disadvantages, i.e., the process of welding rods to the end plates is expensive and prone to failure. The end plates make the cradle heavier, and more cumbersome, and is more difficult to clean because numerous small corners are created at the junction of the rods and the end plates.

It is an object of the present invention to provide a rotisserie cradle of the type described of an improved construction which is lighter, cheaper to make, less prone to have manufacturing defects, and easier to clean.

It is another object of the present invention to provide such a rotisserie cradle in which securing and releasing the food to be cooked is simpler and easier and does not require slow manual adjustments to be made on screw elements or the like.

SUMMARY OF THE INVENTION

These objects and others which will be understood upon a reading of the following specification and claims, are achieved by a rotisserie cradle including a trough shaped cradle framework which is constructed entirely of a welded framework of rods, and does not include the solid end plates of the prior art.

The cradle framework is formed by a series of rectangular rod frames of decreasing width, held in a spaced apart stacked array to form the cradle framework by means of series of U-shaped pieces welded to the sides of the rectangular rod frames as well as a U-shaped piece welded to each end of the spaced apart stack of frames.

A rotational shaft support socket is held at each end by a grooved block captured by end rod segments of two adjacent rod frames. The U-shaped pieces welded at the ends each confine one of the grooved blocks to locate the same centered on the cradle ends. This construction eliminates end plates to provide a lighter, easier to handle and clean rotisserie cradle which is cheaper to construct and is less likely to have manufacturing defects.

The food items to be roasted are held against the inside of the cradle framework by one or more gratings which can each be swung into the trough-shaped interior of the cradle framework, each mounted on an outer end of pivoted swing anus which is held in any selected position by a frictional snubber device so as to hold the food item against the inside of the cradle trough.

Each hold down grate has a connection to a swing arm that allows tilting movement of the grate in any direction to conform the same to the particular contour of the food item.

Each hold down grates is connected to the swing arm off centered in the lengthwise direction so as to tilt away when the swing arm is swung out, allowing room for the food item to be loaded into the cradle framework without having to manually hold the grate out of the way.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
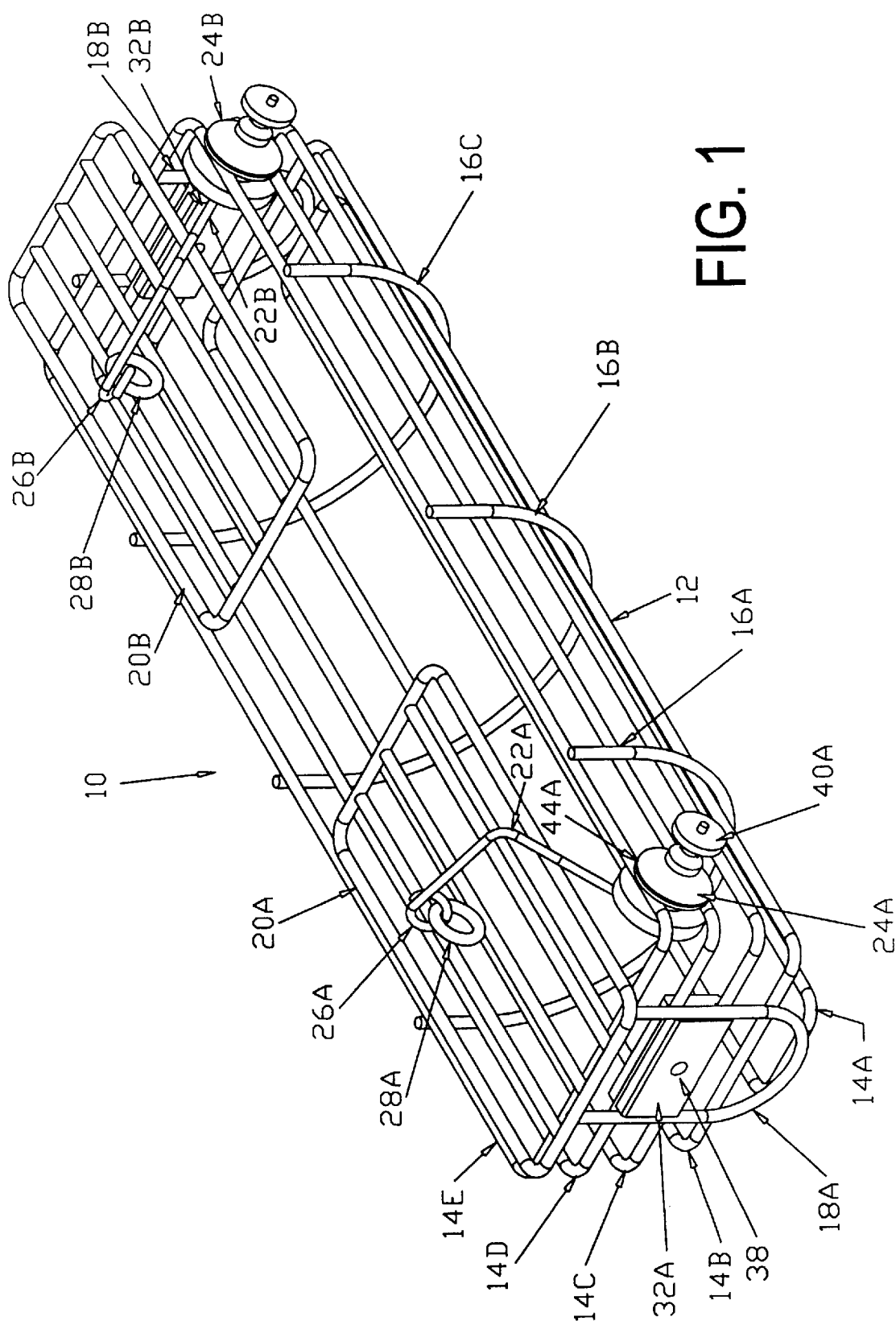
FIG. 1 is a perspective view of the rotisserie cradle according to the invention.

Referring to FIG. 1, the rotisserie cradle according to the invention 10 includes a trough shaped cradle framework 12 for receiving and holding one or more food items for roasting. The trough-shaped cradle framework 12 is built up of a series of spaced apart rectangular rod frames 14A–E of successively increasing widths except for the uppermost two frames 14D, 14E which are of approximately equal width, but all being of the same length. This construction creates a roughly cylindrical trough shape.

The rectangular frames 14A–14E are held in lengthwise alignment with each other and in their spaced apart relationship by a series of U-shaped rod pieces 16A–C, each wrapped around the outside of the lengthwise rod segments of each frame 14A–14E at different positions along their length, and welded thereto.

A pair of end U-shaped pieces 18A, 18B extend outside respective end rod segments of each frame 14A–E and are welded thereto.

The various rods are either of stainless steel or plated or coated steel suitable for use in grilling food over a charcoal, gas or electric fired heat source.

The resulting cradle framework is configured in a trough shape.

A pair of hold down grates 20A, 20B each supported for tilting movement in any direction on the outer end of a respective one of a pair of swing arms 22A, 22B at either end of the framework 12, so as to be manually swingable into or out of the inside of the cradle framework 12, but maintained in any selected position by a friction snubber 24A, 24B, each acting on the pivoted end of a respective swing arm 22A, 22B to create a frictional positioning thereof in any adjusted position. The swing arms 22A, 22B are angled in so that the outer ends and the grates 20A, 20B are located in the approximate center of the cradle framework 12.

Figure 2:
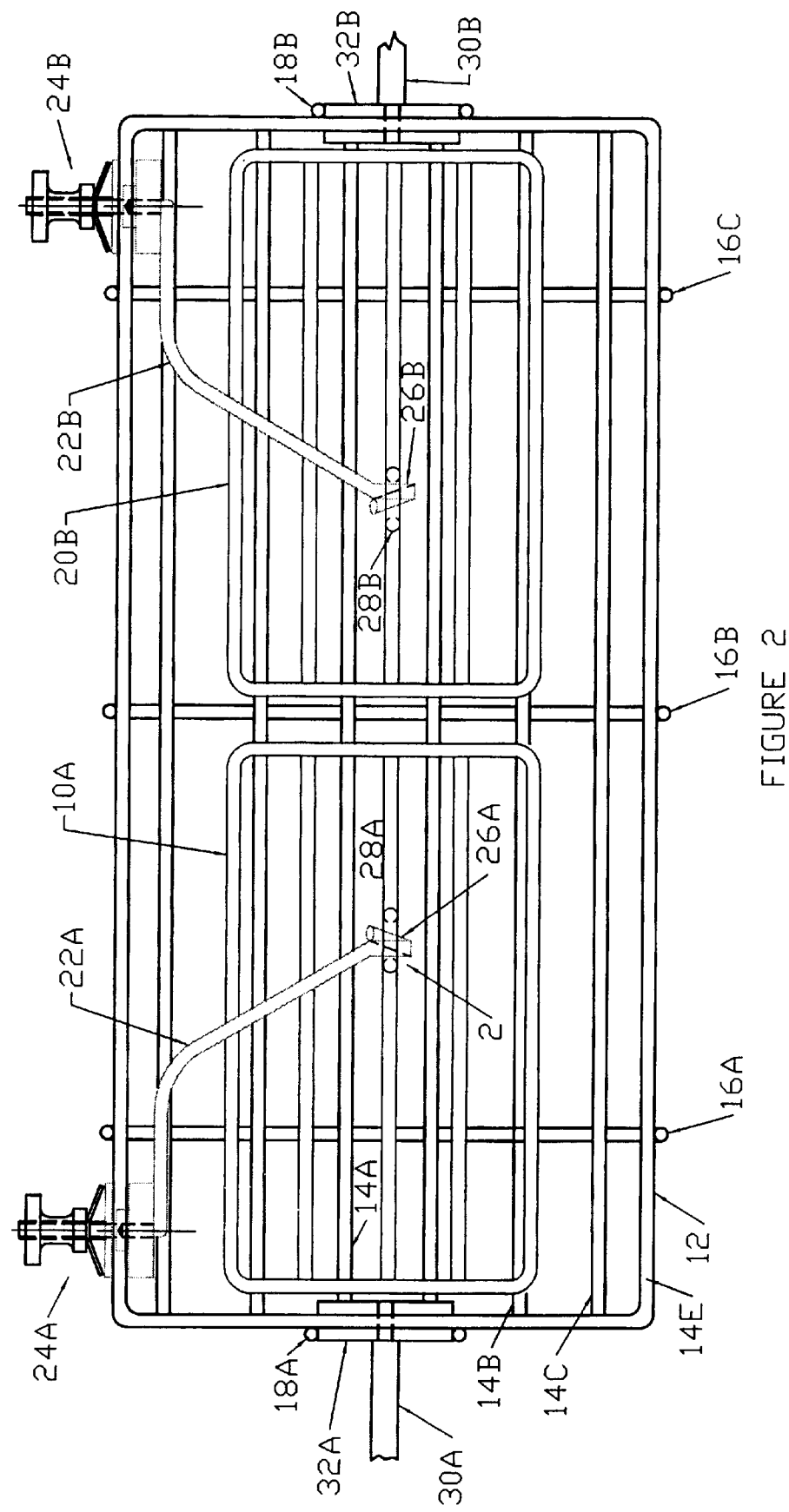
FIG. 2 is a top plan view of the rotisserie cradle shown in FIG. 1, together with fragmentary portions of rotary drive shafts on which the rotisserie cradle is mounted.

The outer end of each swing arm 22A, 22B suspends a respective hold down grate 20A, 20B by interlinked rings 26A, 26B and 28A, 28B affixed respectively to the swing arm outer ends and the middle of each grate 22A, 22B, but at a point along the length thereof past the center (best seen in FIG. 2) so that each grate 22A, 22B tends to swing out for a purpose to be described below.

Figure 3:
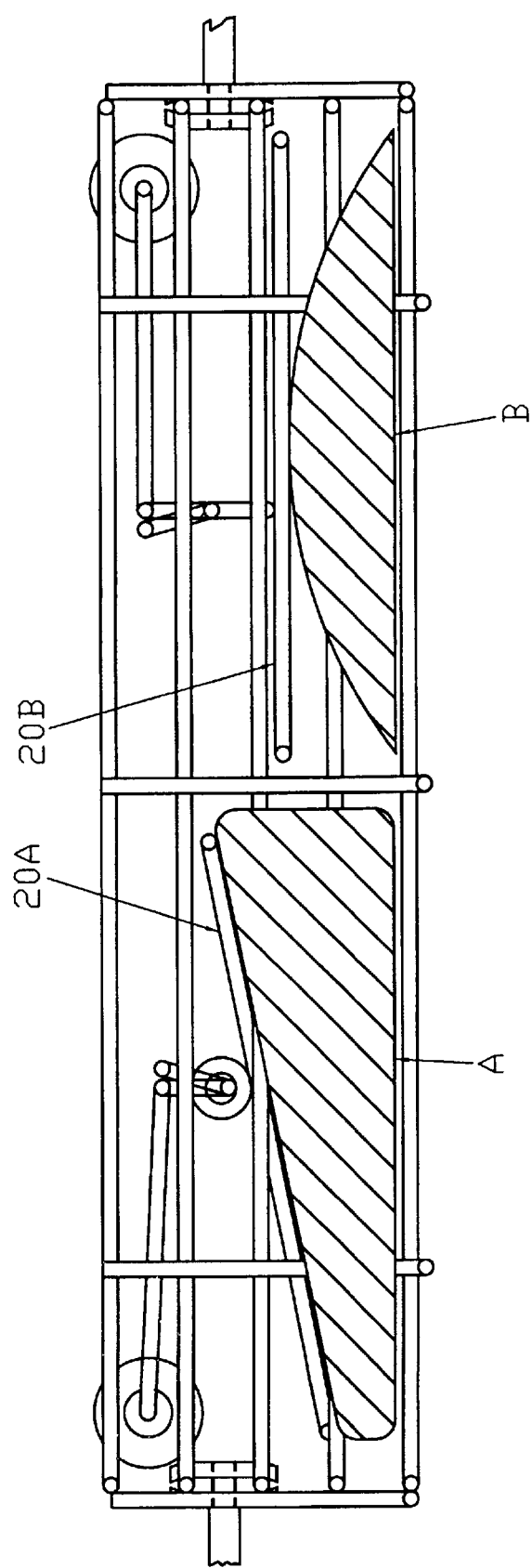
FIG. 3 is a front view of the rotisserie cradle shown in FIG. 1, with fragmentary portions of rotary drive shafts on which the rotisserie cradle is mounted.

As seen in FIG. 3, the grates 20A, 20B are individually inclined at different lengthwise angles to match the contours of the food items A, B.

More than two hold down grates may be employed for long length rotisserie cradles.

Figure 4:
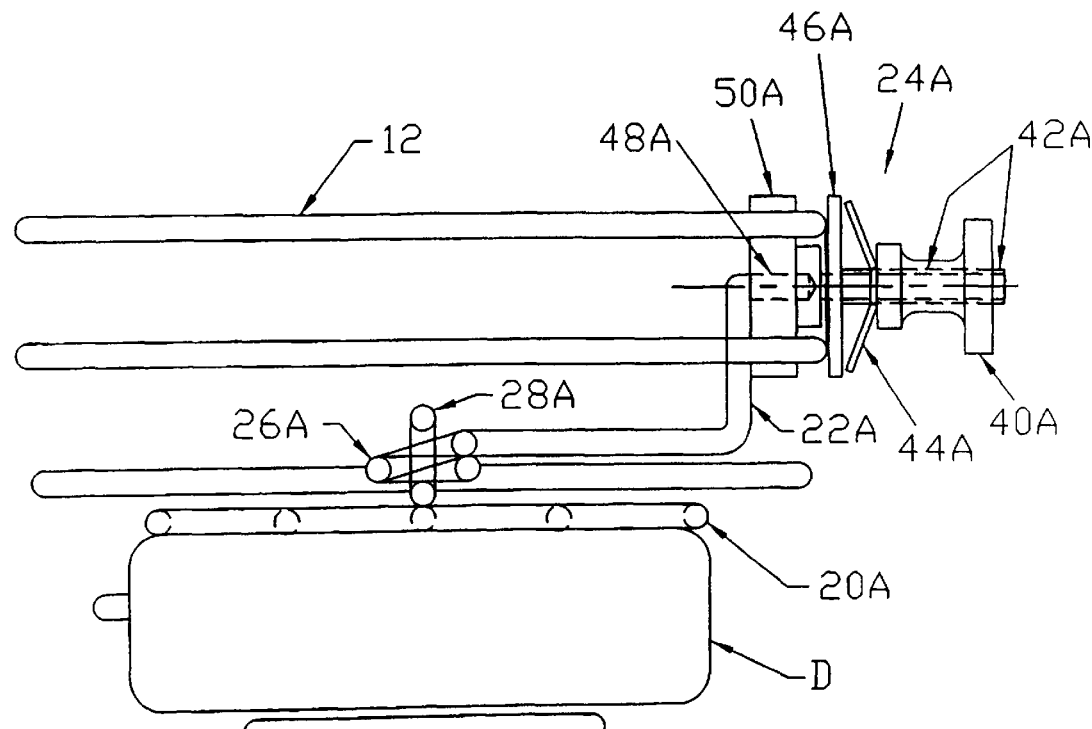
FIGS. 4–7 are end side views of portions of the rotisserie cradle shown in FIG. 1 with a food items of various shapes held in the rotisserie cradle.
Figure 5:
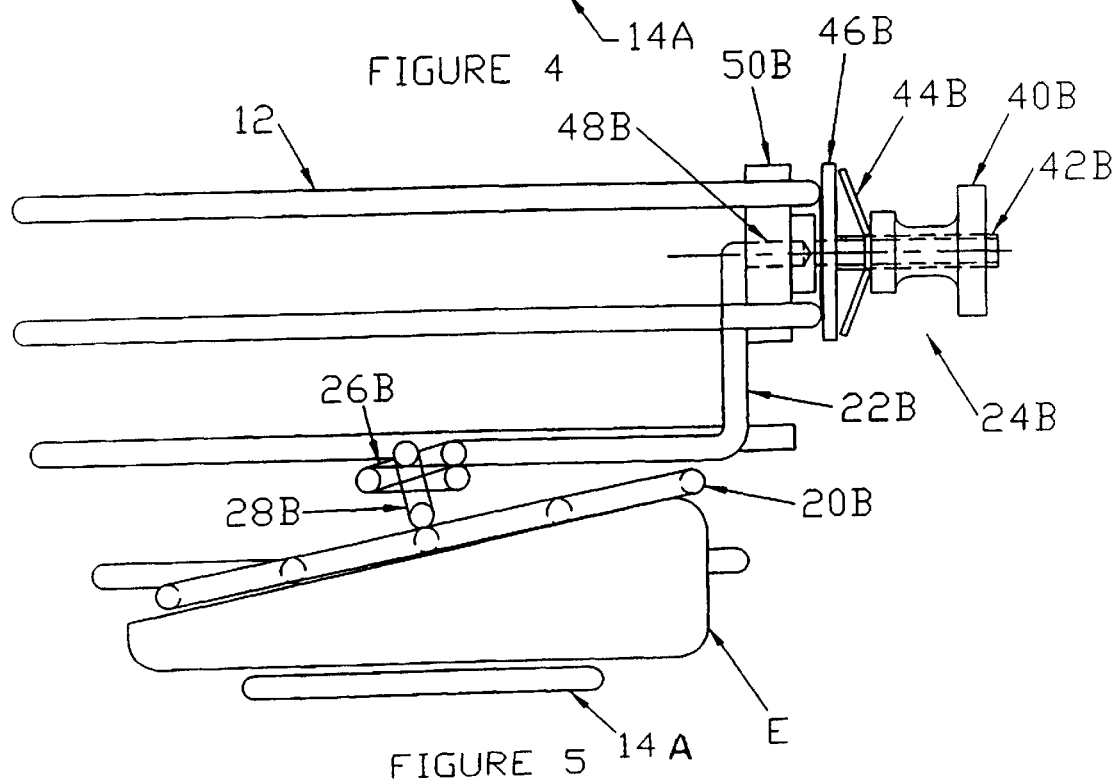
Figure 6:
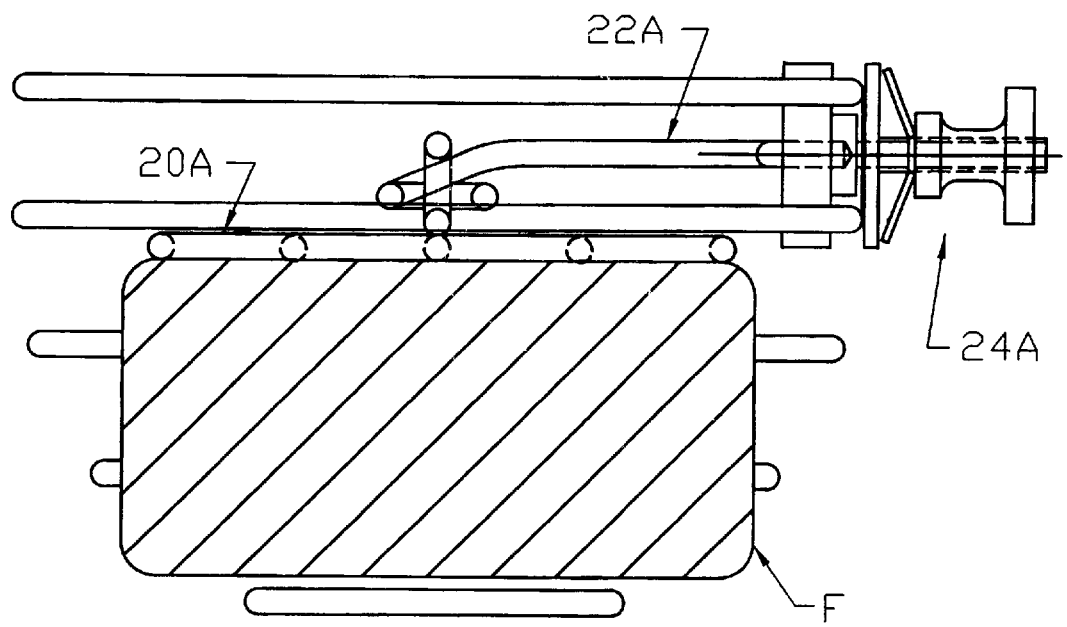
Figure 7:
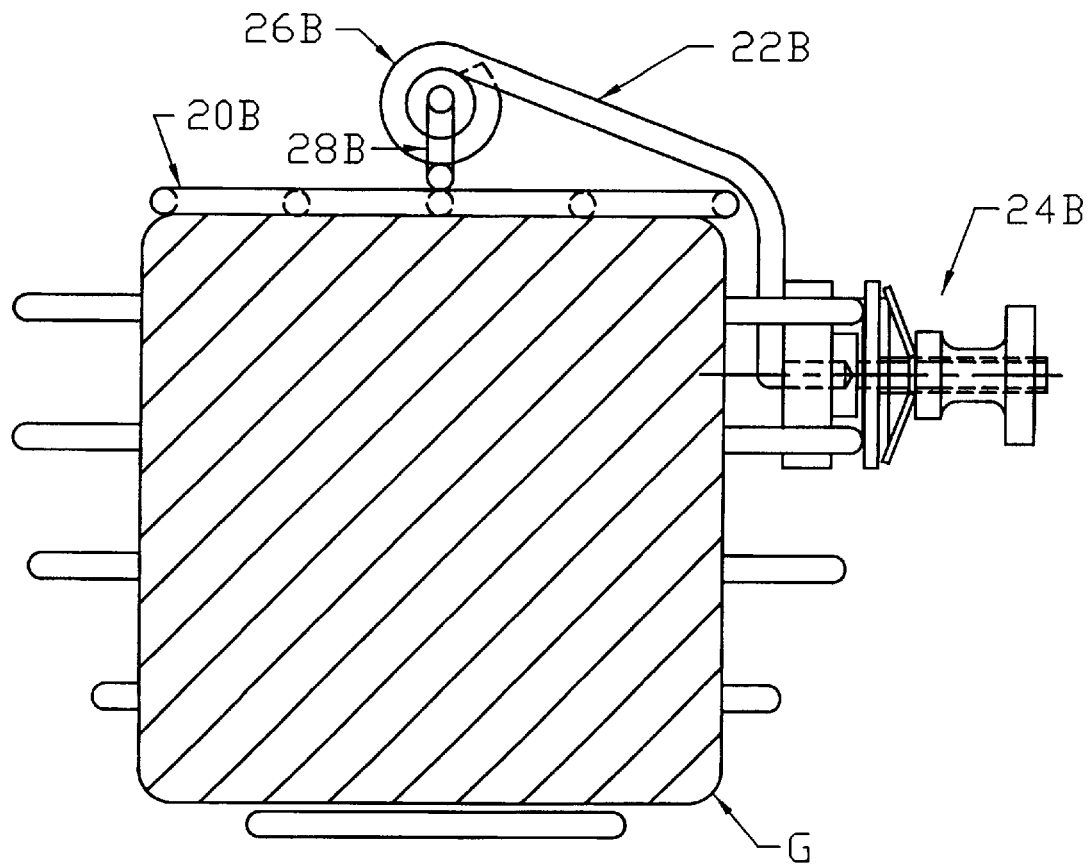

FIGS. 4 and 5 show a difference in side-to-side inclination of hold down grates 20A, 20B to accommodate different food contours of items D and E, while FIGS. 6 and 7 show the accommodation to different thicknesses of food items F and G, by upward swinging adjustment of the swing arms 22A, 22B, while the grates 20A, 20B remain horizontal.

Figure 8:
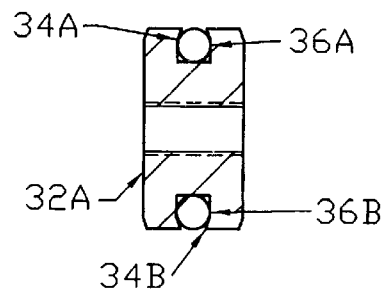
FIG. 8 is a cross sectional view through a socket block and supporting cradle framework rod segments.
Figure 9:
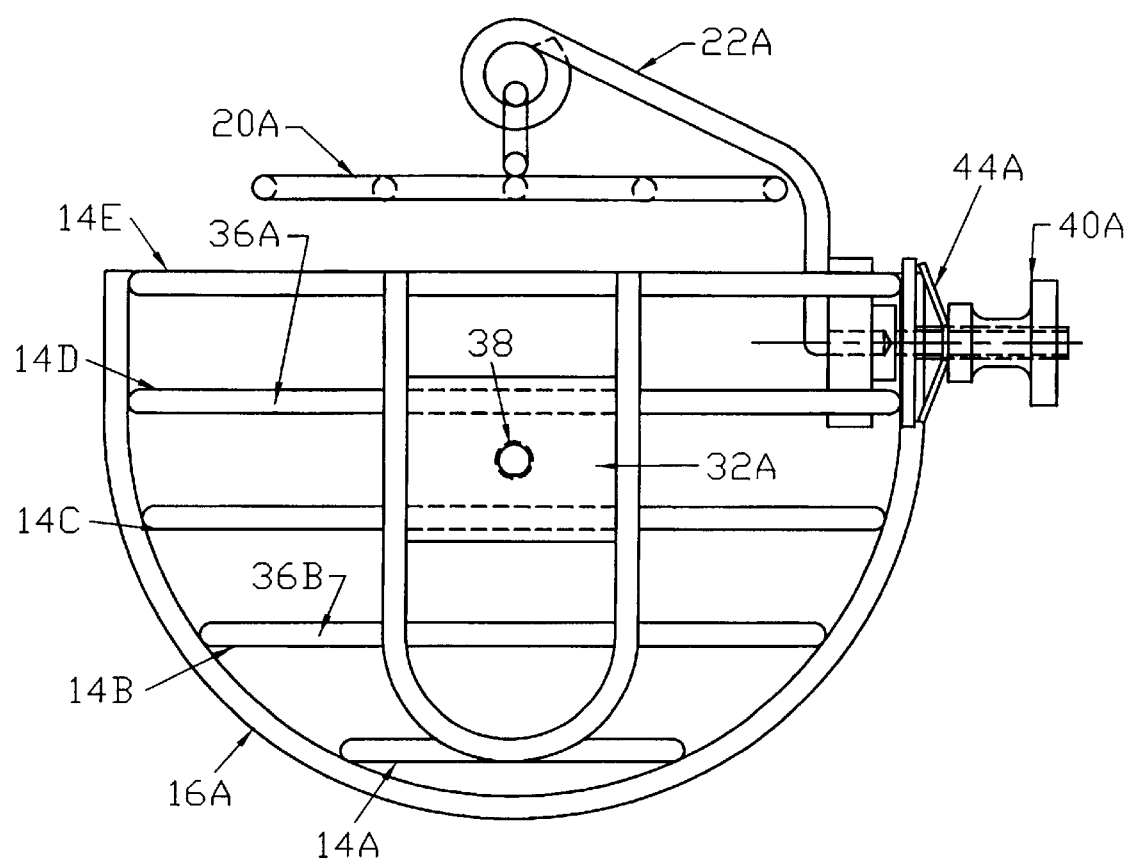
FIG. 9 is an end side view of the rotisserie cradle shown in FIG. 1.

The rotisserie cradle 10 is mounted on rotary rotisserie shafts 30A, 30B by socket blocks 32A, 32B mounted to respective ends of the cradle framework 12. The blocks 32A, 32B have grooves in their upper and lower faces (FIG. 8) receiving the cross rods 36A, 36B of rectangular frames 14E, 14D respectively (best seen in FIG. 9). The legs of U-shaped pieces 18A, 18B confines a respective socket block 32A, 32B sideward movement.

A bore 38 (which may be tapped) in each socket block 32A, 32B receives a respective shaft 30A, 30B.

The details of the friction snubbers 24A, 24B can be seen in FIGS. 4–7 and 9.

A knurled threaded knob 40A, 40B is threaded onto a threaded shaft 42A, 42B fixed projecting from a stepped washer 5OA, 50B which shaft passes through a central opening of a Belleville spring 44A, 44B, pressed against a flat washer 46A, 46B engaging the side of cradle framework 12.

The swing arms 22A, 22B each have an angled end segment 48A, 48B passed into a hole in stepped washer 50A, 50B and welded thereto.

The stepped washer 50A, 50B is located vertically between the long side rods of the top two rectangular frames 14D, 14E by the smaller diameter step positioned therebetween. Thus, advancement of the threaded knob 40A, 40B generates an adjustable pressure in the Belleville spring 44A, 44B to squeeze the washers 50A, 50B and 46A, 46B against the long side rods of the frames 14A, 14E. The resulting friction maintains the swing arms 22A, 22B in any selected pivot position.

Figure 10:
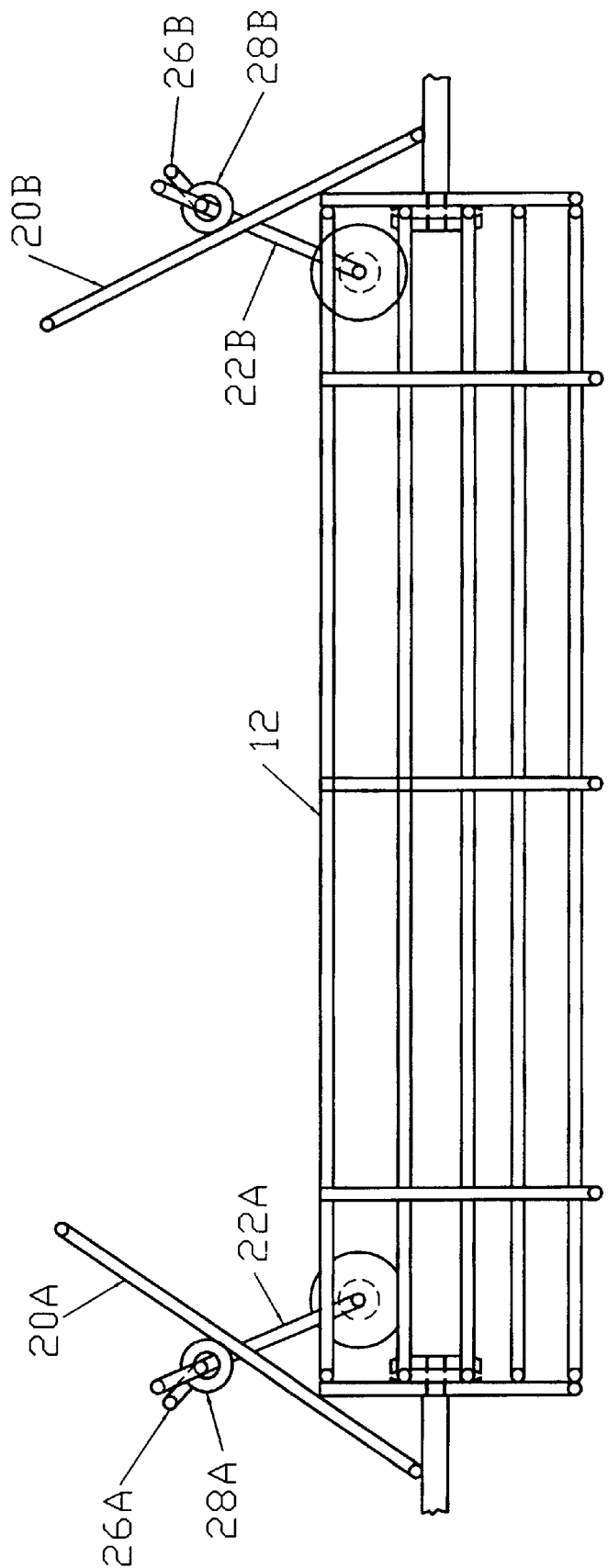
FIG. 10 is a front view of the rotisserie cradle shown in FIGS. 1 and 2, with the hold down grates moved to a swung out position allowing loading of food items into the cradle framework.

FIG. 10 shows that when the swing arms 22A, 22B are positioned swung out away from the interior of the cradle framework 12, the hold down grates 20A, 20B tilt up due to the off center position of rings 26A, B, 28A, B creating an unbalance causing this effect. Thus, the gratings 20A, 20B are self positioned to be out of the way for loading a roast into the cradle framework 12.

What is claimed is:

1. A rotisserie cradle for holding food items rotated over a heat source to be roasted comprising:
    a cradle framework, comprising an array of rods forming the sides, bottom and end walls of an elongated open topped trough;
    said cradle framework further comprised of a stacked alignment of spaced apart rod frames held together by rod pieces extending across side portions of said rod frames and welded thereto, said rod frames having end portions collectively forming said end walls of said cradle framework;
    a rotary support affixed to each end wall for shaft ends rotatably supporting said cradle framework over said heat source; and
    a releasable hold down for pressing a food item to be cooked against the inside of said cradle framework.

2. A rotisserie cradle according to claim 1 wherein rod frames one of equal length but at least some of which are of successively smaller width said spaced apart frames held in position by rod pieces extending across and welded to the outside of said rectangular frame.

3. The rotisserie cradle according to claim 1 wherein said rod pieces include a series of U-shaped pieces wrapped around the sides of said rod frames.

4. The rotisserie cradle according to claim 3 wherein said U-shaped pieces include a rod piece extending over and welded to said end portions of said rod frames.

5. The rotisserie cradle according to claim 4 wherein said rotary support at each end of said cradle framework comprises a socket block at each end disposed between two successive stacked rectangular frames, each socket block grooved along the top and bottom to receive an end segment of each rectangular frame.

6. The rotisserie cradle according to claim 5 wherein said U-shaped pieces at each end of said cradle framework straddle and confine a respective socket block.

7. A rotisserie cradle for holding one or more food items to be rotated over a heat source to be roasted thereby, comprising:
    a trough shaped cradle framework comprising a framework open on the sides and bottom thereof;
    an element at each end of said cradle framework adapted to be engaged with a rotary support;
    at least one hold down structure mounted to be swung into said cradle and engage a food item to hold the same against the inside of said cradle as said cradle rotates by a swing arm able to be manually pivoted to swing said hold down structure, said swing arm in turn mounted to maintain any manually set pivoted position thereof as said cradle framework rotated.

8. The rotisserie cradle according to claim 7 including a frictional snubber associated with said swing arm to hold said swing arm in any pivoted position.

9. The rotisserie cradle according to claim 7 wherein said swing arm is pivotally mounted to one side of said cradle on the inside thereof so as to be swingable generally parallel to the length of said cradle to carry said holder structure in and out of said cradle framework.

10. The rotisserie cradle according to claim 9 wherein said swing arm is pivotally mounted adjacent one end of said cradle and another swing arm is pivoted to the inside side of said cradle at an opposite end, said another swing arm carrying another hold down structure into engagement with a food item in said cradle to hold the same against the inside of said cradle, said another swing arm manually positionable to hold said hold down structure against a food item in said cradle.

11. The rotisserie cradle according to claim 7 wherein said hold down structure is mounted to an outer end of swing arm so as to allow tilting thereof in any direction.

12. The rotisserie cradle according to claim 11 wherein said hold down structure is connected by a pair of interlinked rings, one of said pair of rings attached to said swing arm outer end, and the other of said pair of rings attached to said hold down structure.

13. The rotisserie cradle according to claim 12 wherein said one ring is attached to said hold down structure at a point offset the lengthwise center of said hold down structure to tend to cause said hold down structure to pivot up and out of said cradle framework, to facilitate loading of food items into said cradle.

14. The rotisserie cradle according to claim 7 wherein said hold down structure comprises a grate.

15. The rotisserie cradle according to claim 14 wherein said grate is rectangular and is connected to an outer end of said swing arm to freely allow pivoting thereof in any direction.

16. The rotisserie cradle according to claim 15 wherein said swing arm is pivotally mounted at an inner end to said cradle framework so as to maintain any adjusted pivoted position to enable said hold down structure to be held against said food item as said cradle framework is rotated.

17. The rotisserie cradle according to claim 7 wherein said cradle framework includes a stacked alignment of spaced apart rectangular open frames of equal length but at least some of which of successively smaller width, said spaced apart frames held in position by pieces extending across and welded to the outside of said rectangular frame.

18. The rotisserie cradle according to claim 17 wherein said pieces include a series of U-shaped rods wrapped around the sides of said rectangular frames.

19. The rotisserie cradle according to claim 17 wherein said pieces include a piece extending over and welded to each end of said rectangular frames.

20. The rotisserie cradle according to claim 17 wherein said rotary support at each end of said cradle framework comprises a socket block at each end disposed between two successive stacked rectangular frames, each socket block grooved along the top and bottom to receive a portion of each of said two successive rectangular frames.

21. The rotisserie cradle according to claim 19 wherein said pieces at each end of said cradle framework are U-shape and straddle and confine a respective socket block.

22. The rotisserie cradle according to claim 16 wherein said swing arm is angled in to position said outer end in the center of said cradle framework.

23. The rotisserie cradle according to claim 8 wherein said friction snubber includes a pair of washers each engaging an opposite side of two of said rectangular frames clamped to portions of two of said rectangular frames by a threaded shaft fixed to one washer extending through the other washer, a threaded knob received on said threaded shaft and engaging said other washer via an interposed Belleville spring developing a spring force, said washers generating frictional assistance to pivoting of said swing arm, said Belleville spring compressed against a relatively fixed surface to generate a frictional force monitoring a manually set pivoted position of said swing arm.

24. The rotisserie cradle according to claim 23 wherein one of said pair of washers has a stepped diameter, with a smaller diameter portion interposed between said two rectangular frames.

* * * * *

UNITED STATES PATENT AND TRADEMARK OFFICE
CERTIFICATE OF CORRECTION

PATENT NO. : 6,367,373 B2  Page 1 of 1
DATED : April 9, 2002
INVENTOR(S) : Ronald D. Bargman It is certified that error appears in the above-identified patent and that said Letters Patent is hereby corrected as shown below:

<u>Column 2,</u>
Line 5, delete "anus" insert therefor -- arms --.

Signed and Sealed this

Eighteenth Day of June, 2002

Attest:

Attesting Officer

JAMES E. ROGAN
*Director of the United States Patent and Trademark Office*